US007335387B2

(12) United States Patent
Hayes et al.

(10) Patent No.: US 7,335,387 B2
(45) Date of Patent: Feb. 26, 2008

(54) METHODS, CAPSULE AND APPARATUSES FOR THE PRODUCTION OF FOAMED DRINKS

(75) Inventors: Michael A. Hayes, Waltham St. Lawrence (GB); David A. Hester, Thatcham (GB); Jon W. Shaw, Oakley (GB); Martin E. Colston, Newbury (GB); Geoffrey Furneaux, Overton (GB); Elizabeth C. Charman, Totton (GB); Glenn Harrison, Winchester (GB); John C. Cooke, Farnborough (GB); David Hay, Basingstoke (GB); Michael Wright, Alton (GB)

(73) Assignee: Mars, Inc., McLean, VA (US)

( * ) Notice: Subject to any disclaimer, the term of this patent is extended or adjusted under 35 U.S.C. 154(b) by 668 days.

(21) Appl. No.: 10/475,362

(22) PCT Filed: Apr. 26, 2002

(86) PCT No.: PCT/GB02/01945

§ 371 (c)(1),
(2), (4) Date: Mar. 8, 2004

(87) PCT Pub. No.: WO02/087400

PCT Pub. Date: Nov. 7, 2002

(65) Prior Publication Data

US 2004/0137128 A1    Jul. 15, 2004

(30) Foreign Application Priority Data

| Apr. 27, 2001 | (GB) | ................................... 0110420.7 |
| Apr. 27, 2001 | (GB) | ................................... 0110421.5 |
| Sep. 18, 2001 | (GB) | ................................... 0122514.3 |
| Sep. 18, 2001 | (GB) | ................................... 0122515.0 |

(51) Int. Cl.
*A47J 31/24* (2006.01)
(52) U.S. Cl. .................. 426/433; 426/77; 426/112; 426/82; 99/295; 99/302 R; 99/287
(58) Field of Classification Search ................. 99/295, 99/302 R, 323.1, 287; 426/433, 112, 115, 426/77, 82
See application file for complete search history.

(56) References Cited

U.S. PATENT DOCUMENTS 3,347,151 A * 10/1967 Ronalds ....................... 99/295

(Continued)

FOREIGN PATENT DOCUMENTS

EP           0 756 844 B1      5/1999

(Continued)

*Primary Examiner*—Reginald L. Alexander
(74) *Attorney, Agent, or Firm*—Fulbright & Jaworski; Jan K. Simpson

(57) ABSTRACT

The invention provides a method for the preparation of a foamed drink comprising the steps of: providing a capsule containing a foamable ingredient; providing a receptacle positioned to collect fluid escaping from the capsule; injecting liquid into the capsule to mix with the foamable ingredient; allowing the foamable ingredient mixed with the liquid to escape from the capsule into the receptacle; followed by injecting further liquid into the receptacle in a jet having a diameter of from about 0.5 to about 2 mm to produce foamed liquid in the receptacle. The invention also provides capsules, apparatus and systems specifically adapted for use in the method. Preferably, the food ingredient is a milk powder, and the method produces a hot foamed beverage such as a cappuccino coffee.

27 Claims, 4 Drawing Sheets

U.S. PATENT DOCUMENTS 3,628,444 A * 12/1971 Mazza ............................ 99/275
4,388,338 A * 6/1983 Wittenborg .................. 426/590
4,516,484 A    5/1985 De Ponti
4,738,378 A    4/1988 Oakley et al.
5,154,112 A * 10/1992 Wettern ...................... 99/323.1
5,398,596 A    3/1995 Fond
6,186,051 B1 * 2/2001 Aarts ............................ 99/295
6,240,832 B1   6/2001 Schmed et al.
6,740,345 B2 * 5/2004 Cai ............................... 426/77

FOREIGN PATENT DOCUMENTS

| EP | 0 950 996 A2 | 10/1999 |
| EP | 1 088 504 A1 | 4/2001 |
| WO | WO 01/08504 A1 | 2/2001 |
| WO | WO-01/58786 A1 | 8/2001 |
| WO | WO-02/19875 A1 | 3/2002 |

* cited by examiner

METHODS, CAPSULE AND APPARATUSES FOR THE PRODUCTION OF FOAMED DRINKS

CROSS-REFERENCE TO RELATED APPLICATIONS

This application is a national stage application of PCT/GB02/01945 filed Apr. 26, 2002 claiming priority to GB 0110420.7 and GB 0110421.5 filed Apr. 27, 2001 and GB 0122514.3 and GB 0122515.0 filed Sep. 18, 2001.

TECHNICAL FIELD

The present invention relates to methods and apparatus for the production of foamed drinks, and in particular for the production of foamed multicomponent beverages such as cappuccino coffee and frothy hot chocolate.

BACKGROUND OF THE INVENTION

Multicomponent beverages are beverages that are formed by mixing two separately prepared liquid beverage components (other than water). Other examples of multicomponent beverages are for example "chocaccino" made by mixing a hot chocolate with a coffee.

It is known to form edible foams from fresh milk, for example in milk shakes. It is also known to serve coffee and other hot beverages with a layer of hot milk foam over the liquid beverage. The hot milk foam is traditionally made by injecting steam under pressure through a hollow steam wand into cold fresh milk to heat and foam the milk. The milk foam is then poured onto liquid coffee to form the beverage, for example cappuccino or latte.

The milk foaming is normally carried out separately from the coffee brewing, because the essential oils present in coffee have a deleterious effect on foaming.

The traditional method of forming hot milk foam for cappuccino or latte does not lend itself to use in beverage vending installations. This is in part because fresh or liquid milk is difficult to handle in such installations. Furthermore, most vending installations are not equipped to supply steam under pressure. In addition, the use of a steam wand immersed in the liquid milk could present contamination problems.

It is known to provide a powdered beverage whitener containing encapsulated nitrogen gas that produces a foam when it is dispersed in coffee. However, the foam does not have the same bulk and stiffness (spoonability) as a conventional cappuccino foam.

It is also known to produce a foam in a vending machine by depositing a powdered milk into a cup, followed by jetting hot water into the cup to dissolve the powdered milk and foam the milk by the action of high shear between the water jet and the milk. This suffers from the reduced consumer acceptability and mess associated with depositing a powdered milk into the cup. Furthermore, the milk powder may not dissolve completely. In order to achieve more complete dissolution of the powder it is necessary to move the jet relative to the cup by means of an X-Y table or similar equipment, thereby increasing the cost of the apparatus.

U.S. Pat. No. 2,977,231 describes pressurised packages containing liquid concentrates, especially for the production of milkshakes. The packages have a discharge orifice of diameter about 1.3 to 2.4 mm (0.05 inch to 0.09 inch) and are pressurized to about 500 kPa (75 pounds). The resulting narrow, high speed jets achieve effective mixing and foaming through shear forces when injected into water.

U.S. Pat. No. 3,622,354 describes packages similar to those of U.S. Pat. No. 2,997,231, but with the viscosity of the liquid concentrate in the package controlled so as to enable satisfactory mixing and foaming to be achieved with a nozzle diameter of about 3 mm. This enables the package to be dispensed more quickly.

EP-A-0885154 describes a dispensing device for the preparation of a foamy beverage. The device contains a milk concentrate and is pressurised to 900-1000 kPa (9-10 bar) with an orifice diameter of at most 1 mm. The resulting very high speed jet of the concentrate gives effective mixing and foaming of the concentrate when it is injected into a liquid beverage.

WO01/58786 describes a rigid molded cartridge for forming foamed beverages, wherein the flow path of the beverage inside the cartridge includes a jet-forming orifice, and a surface against which the beverage jet impacts. An air inlet is provided in the cartridge, and air is drawn in through the inlet and turbulently mixed with the beverage jet inside the cartridge to produce a foam.

BRIEF SUMMARY OF THE INVENTION

In a first aspect, the present invention provides a method for the preparation of a foamed drink comprising the steps of: providing a capsule containing a foamable ingredient; providing a receptacle positioned to collect fluid escaping from the capsule; injecting liquid into the capsule to mix with the foamable ingredient; allowing the foamable ingredient mixed with the liquid to escape from the capsule into the receptacle; followed by injecting further liquid into the receptacle in a jet having a diameter of from about 0.5 to about 2 mm to produce foamed liquid in the receptacle.

In a second aspect, the present invention provides a method of preparing foamed drink comprising the steps of: providing a capsule for the preparation of an edible foam, said capsule comprising side walls defining an interior region containing a foamable ingredient, an inlet for injecting a liquid into the said region, and an outlet for allowing liquid to escape from the said region, wherein at least one of the said inlet and outlet comprises a constriction for providing a liquid jet having a diameter of from about 0.5 to about 2 mm; injecting an aqueous liquid under pressure into the inlet; allowing the foamable food ingredient to mix with the aqueous liquid in the capsule; followed by allowing the aqueous liquid to escape through the outlet of the capsule and into a receptacle as a high velocity jet.

The first and second aspects of the invention are linked by the special technical feature that the initial mixing of the foamable ingredient and the aqueous liquid takes place inside the capsule, thereby ensuring that the foamable ingredient is well dispersed and that the mess associated with the use of in-cup powders is avoided.

The foamable ingredient is any food-acceptable substance that will form a foam on high shear mixing with water. The foamable ingredient is usually at least partially dehydrated for ease of handling and maximum storage stability. Preferably, the water content of the foamable ingredient is less than 50% by weight, more preferably less than 25% by weight, and most preferably the foamable ingredient is a particulate solid. Typically the foamable ingredient comprises a partially or completely dehydrated dairy or non-dairy beverage whitener such as milk. Preferably, the foamable ingredient consists essentially of a foamable dairy or non-dairy milk concentrate, for example a granulated dried milk or a spray dried milk powder, optionally fat reduced. In certain embodiments the ingredient comprises an instantised milk granulate. Various milk powders are suitable, and the fat content and other characteristics of the milk powder can be optimized for each case. The milk powder may form part of a hot chocolate drink or other beverage.

The dry weight of the foamable ingredient may be from about 1 to about 50 g, preferably from about 5 to about 15 g. In other words, the amount of the ingredient in each capsule is preferably sufficient for one portion of a foamed product, e.g. one cup of a foamy beverage.

The capsule is normally disposable after one use. The capsule may comprise at least one side formed from a substantially rigid sheet material. For example, capsules having substantially cylindrical or truncated conical shapes are envisaged. More typically the capsule comprises a body formed at least in part from flexible film material, for example a tubular sachet formed on a form-fill-seal machine, or a body formed by bonding together front and back sheets of film material around the edges thereof to define a sachet. The capsule will normally be substantially air and moisture impermeable before use in order to preserve the food ingredient in a shelf stable condition. Preferably, the package is substantially shelf stable. That is to say, it may be stored at ambient temperature and atmospheric conditions for a period of at least 3 months, preferably at least one year, without significant deterioration of the contents.

In certain embodiments the internal volume of the capsule is from about 25 to about 100 cm$^3$. The internal volume refers to the maximum volume of the capsule when any flexible parts are fully distended but not stretched. This internal volume is typically at least twice the volume of the foamable ingredient, in order to allow space for turbulent flow and mixing of the aqueous liquid with the ingredient in the capsule.

The capsule may be provided with an inlet nozzle, for example as described in EP-A-0179641 or WO-A-9905036, the entire contents of which are incorporated herein by reference. In certain embodiments the method may comprise injecting liquid into two or more inlets in the capsule in order to improve mixing with the foamable ingredient. The two or more inlets may be connected through a manifold to a single liquid inlet duct. At least one of the inlets may be angled to assist turbulent mixing and washing out of the capsule.

The method according to the invention initially operates by enabling, first, turbulent mixing of the liquid and the foamable ingredient in the capsule, followed by deposition of the resulting mixture into the receptacle and jetting liquid into the mixture in the receptacle to provide foaming. The use of a capsule removes earlier problems with direct deposition of milk solids into a receptacle and provides a better quality foam in larger quantities.

In certain embodiments the outlet of the capsule is initially sealed by freshness barrier. The term "freshness barrier" refers to a barrier that is substantially impermeable to air or moisture so as to preserve the freshness of the foamable ingredient by preventing ingress of air or moisture through the liquid guide before brewing commences. The freshness barrier may be released by an external mechanical force or thermal field applied during brewing. The freshness barrier is preferably releasable by the action of pressure and/or hot water from inside the capsule during brewing. For example, the freshness barrier may comprise a layer of a sealant that is released by the action of heat and/or moisture, such as an adhesive as described in EP-A-0179641 or WO99/05036.

For example, in certain embodiments the capsule comprises two flexible sheets bonded together along a seam situated opposite the inlet, said bonding being releasable by the action of heat or pressure inside the capsule, whereby the two sheets peel apart under said action to provide said opening.

Where the outlet is sealed by a freshness barrier as hereinbefore described, the injection of liquid into the capsule initially causes mixing with the foamable food ingredient. The freshness barrier is then released to form said opening, thereby releasing the food ingredient into the receptacle.

Preferably, the aqueous liquid consists essentially of water, optionally mixed with steam. In certain embodiments the liquid is injected into the capsule at a pressure of from about 30 kPa (0.3 bar) to about 200 kPa (2 bar). These pressures are suitable for use in vending equipment without special measures.

In certain embodiments the liquid is injected in a two stages: a first, relatively low pressure stage to achieve mixing with the foamable ingredient inside the capsule, followed by a second, high pressure stage to generate foam. The amount of liquid injected into the capsule containing the foamable material in the first stage is typically from about 25 ml to about 100 ml. The total amount of liquid injected in the first and second stages is typically about 100 ml to about 400 ml, corresponding to about a single cup of beverage.

The liquid may be injected into the foam forming jet by a peristaltic or piston pump, preferably at an average rate of from about 250 to about 2000 ml/min and more preferably from about 500 to 1500 ml/min. The liquid may be injected in intermittent or pulsed fashion to optimize the amount of foam or the organoleptic properties of the product.

For a hot foamed beverage the temperature of the liquid is typically from about 75 to about 100 degrees C.

The step of injecting liquid into the capsule containing the foamable material is followed by the step of injecting a jet of liquid into the receptacle containing the liquid/foamable ingredient mixture. The high velocity and narrow diameter of the liquid jet provide strong shear forces that give rise to the formation of a thick foam.

The jet is normally formed by pumping liquid into a narrow-bore jet-forming nozzle. The jet-forming nozzle may form part of the inlet or the outlet of the sachet containing the foam forming ingredient. In other embodiments, the nozzle may be provided on the beverage making apparatus quite separately from the capsule. In yet other embodiments, the nozzle may be demountably inserted into the place of the capsule following ejection of the capsule from the beverage making apparatus, and then supplied with pressurized liquid through the same injection means as the capsule. The internal cross-section of the jet-forming nozzle may be a regular shape, and it may be substantially cylindrical. The simple cylindrical nozzles are especially suitable for the embodiments in which the nozzle is a disposable nozzle forming part of the capsule containing the foamable material, since scale formation is not an issue for disposable nozzles.

Preferably, a circular water jet is produced having a diameter of from about 0.5 to about 2 mm, preferably from about 0.7 to about 1.5 mm. Since water is substantially incompressible and not significantly viscoelastic, it follows that the effective internal cross sectional area of the jet-forming region of the nozzle is generally from about 0.2 to about 3 mm$^2$, preferably from about 0.4 to about 2 mm$^2$, for example about 1 mm$^2$.

If the narrow bore, jet forming region of the jet forming nozzle is too short, then the inlet tends to form a spray rather than a jet. If the narrow bore is too long, then the pressure drop across the nozzle may be too high. Accordingly, the narrow bore region may extend for a distance of from about 1 to about 5 mm, for example about 2 to about 4 mm along the direction of liquid flow. Alternatively, the bore of the jet nozzle may be tapered, as follows.

It has been found that certain jet forming nozzle geometries are especially useful for the methods of the present invention. Accordingly, in a further aspect, the present invention provides a beverage making apparatus, wherein the apparatus comprises a liquid injection nozzle having an inlet and an outlet and a bore extending between the inlet and the outlet, wherein the cross-sectional area of the outlet is from about 0.2 to about 5 mm$^2$, and wherein the bore is tapered between the inlet to the outlet.

The small cross-section of the outlet results in a narrow, high-velocity jet of liquid issuing from the outlet. This jet produces a foam by high-shear mixing of air and liquid when it hits the surface of a liquid in a receptacle. The nozzle according to this aspect of the invention avoids the problems of blockage and scale formation in the nozzle by providing a nozzle with a tapered bore. In particular, the nozzle is normally tapered in the vicinity of the outlet. Preferably, the bore is substantially continuously tapered between the inlet of the nozzle and the outlet of the nozzle.

As noted hereinbefore, the internal cross sectional area of the jet-forming outlet is generally from about 0.2 to about 3 mm$^2$, preferably from about 0.4 to about 2 mm$^2$, for example about 1 mm$^2$. Since water is substantially incompressible and not significantly viscoelastic, it follows that a circular water jet is produced having a diameter of from about 0.5 to about 2 mm, preferably from about 0.7 to about 1.5 mm.

The problems of scale deposition and blockage are further reduced by making the inner surfaces of the bore substantially smooth. That is to say, the inner surfaces of the bore preferably do not have steps or features thereon of height greater than 10 micrometers, and more preferably the inner surfaces of the bore do not have steps or features thereon of height greater than 1 micrometer. The surface roughness of the bore expressed as the root mean square deviation of the surface from the mean is preferably less than 5 micrometers, more preferably less than 1 micrometer. Preferably the RA number as determined by BS 1134-1961 or ASA B46.1-1962 is not worse than 1.6 micrometers, preferably in the range 0.1 to 0.4 micrometers.

The cross-section of the bore preferably does not include any angles that could nucleate scale deposition. Preferably, the cross-section of the bore is substantially circular.

The angle of taper of the nozzle bore is preferably small, so as to reduce turbulence of the liquid in the bore and that a jet, rather than a spray, emerges from the outlet. The taper angle may vary somewhat along the length of the bore. Preferably, the angle of taper of the bore is in the range of from about 0° to about 10°, and more preferably it is from about 0.5° to about 5°, at least in the vicinity of the outlet.

Preferably, the length of the bore is in the range of from about 1 cm to about 10 cm, more preferably from about 2 cm to about 6 cm. The nozzle is preferably formed in one piece by injection molding of a thermoplastic. Preferably, the nozzle is demountably fitted to the beverage making apparatus to permit replacement or cleaning of the nozzle. The nozzle may also be demountable so that it can be inserted and/or removed from the apparatus in a prompted multi-step brewing method as described further below.

Typically, the jet velocity of the liquid jet is from about 3 to about 50 m/s, preferably from about 5 to about 15 m/s. This gives sufficient shear on impact with a liquid body in the receptacle to provide effective foaming. The temperature of the liquid is preferably from about 80 to about 100° C. The liquid is preferably supplied to the inlet at a pressure of from about 0.4 to about 2 bar (40 to 200 kPa), preferably about 0.8 to about 1.2 bar (80 to 120 kPa) which is achievable with conventional vending equipment. The flow rate per jet is preferably from about 4 to about 40 ml/sec, preferably from about 6 to about 18 ml/sec. A plurality of jets may be provided to speed up the rate of liquid addition and foam formation. Preferably, at least one liquid jet is inclined at an angle to the vertical in order to achieve swirling of the liquid in the receptacle. Preferably, the total amount of liquid jetted into the receptacle is from about 30 to about 150 ml, more preferably from about 50 to about 100 ml.

The receptacle is typically a cup, for example a polystyrene cup. Typically, the bottom of the receptacle is located from 5 to 25 cm below the outlet of the capsule.

It is occasionally found that the methods described above produce a foam having undesirable large bubbles near the top. In such cases the method preferably further comprises the step of applying a water spray to the top of the foam in the receptacle after the step of water injection. The water spray disperses the larger bubbles. Typically the water spray is applied for 1 to 5 seconds and has a small droplet size.

The methods of the invention normally comprise the step of holding the capsule in a beverage making apparatus before the step of injecting liquid into the capsule. Preferably, the methods further comprise the step of mechanical ejection of the capsule from the holder after the step of injecting liquid into the capsule. For example, the beverage making apparatus may comprise a waste bin into which the capsule is automatically and mechanically discarded.

The present invention is especially well suited for preparing foamed beverages in conjunction with known brewing steps in known vending machines. For example preferred methods according to the invention further comprise the steps of: providing a second capsule containing a beverage brewing ingredient and having an outlet for allowing fluid to escape from the capsule; injecting water into the second capsule to brew a beverage inside the capsule; and allowing the beverage to escape through the outlet into the receptacle.

Preferably, the step of brewing a beverage is carried out after the steps of producing an edible foamed liquid, and the beverage escapes through the outlet into the edible foamed liquid in the receptacle. This enables drinks such as cappuccino to be made by brewing a coffee capsule immediately after the preparation of the foamy liquid in accordance with the invention, thereby avoiding the deleterious effect of coffee oils on the milk foaming.

In such methods the capsule containing a foamable ingredient and the second capsule containing a beverage brewing ingredient may be sequentially held in, and mechanically ejected from, the same capsule holder in the same brewing apparatus during the method.

In other embodiments, the capsule containing a foamable ingredient and the second capsule containing a beverage brewing ingredient may be simultaneously held in the same brewing apparatus during the method. That is to say, the brewing apparatus has two clamps, or a double clamp, that can be loaded with both capsules at the start of the brewing operation, and that then brews the capsules sequentially. The two clamps or the double clamp may, for example, hold the capsules in side-by-side relationship, or in face to face relationship.

In yet other embodiments, a single capsule may contain the foamable ingredient and the beverage brewing ingredient in separate compartments of the same capsule. The apparatus is then configured to brew the compartments in the capsule sequentially.

Typically, the beverage brewing ingredient comprises ground coffee or leaf tea, preferably in an amount suitable to brew a single cup of beverage. For example, from about 2 g to about 12 g of ground coffee or from about 1 g to about 9 g of leaf tea. It will be appreciated that the construction of the capsule containing a beverage brewing ingredient may be substantially similar to the construction of the capsule containing a foamable ingredient. It is a particular advantage of the present invention that the different capsules can be manufactured and filled on the same equipment, and can be fed sequentially into the same capsule holding, brewing and manipulating mechanism. The beverage brewing capsule may additionally comprise a filter element, such as a filter paper bonded to an interior surface thereof.

The liquid may be injected into the capsule containing the beverage brewing ingredient in amounts, at pressures, and at temperatures similar to those described above in relation to the capsule containing the foamable ingredient.

In other embodiments the liquid is injected into the capsule containing the beverage brewing ingredient at pressures of from about 200 kPa to about 2 MPa (about 2 to about 20 bar), preferably from about 200 kPa to about 1 Mpa (about 2 to about 10 bar). These pressures are conventionally generated for brewing espresso coffee. Preferably, the liquid injected in this stage of the process consists essentially of water.

Preferably the total amount of liquid injected in the process according to the present invention is from 100 to 400 ml. Preferably the product comprises from about 10% to about 50% of foam by volume, more preferably from about 20% to about 35% foam by volume.

In a further aspect the present invention provides a beverage making apparatus for preparing a foamed liquid by a method according to the present invention, comprising: a capsule holder adapted to receive a capsule containing a foamable ingredient; a first pump for supplying liquid under pressure; a liquid injection tube connected to said first pump for injecting liquid into the capsule; and a separate liquid jet foaming nozzle for producing a liquid jet having a diameter of from about 0.5 to about 2 mm.

In certain embodiments the first pump may be used to supply liquid to both the capsule injector and to the liquid jet nozzle. Alternatively, a second pump is provided for supplying liquid to the liquid jet. The liquid preferably consists essentially of water.

The dimensions and shape of the jet forming nozzle in the apparatus and systems of the invention are preferably as described hereinbefore in connection with the methods according to the invention.

The beverage making apparatus preferably further comprises a mechanical ejection means for ejecting capsules from the holder after water injection is complete.

Preferably, the apparatus further comprises a mechanism operatively associated with the holder to retract the injection tube or tubes when the holder is opened.

The liquid jet nozzle is preferably directed downwardly at a small angle to the vertical in order to swirl the beverage being foamed.

In a further aspect the present invention provides a beverage making system comprising: a beverage making apparatus according to the present invention; a capsule containing a foamable ingredient and adapted to be received in the holder of the beverage making apparatus; and a second capsule containing a beverage brewing ingredient and also adapted to be received in the holder of the beverage making apparatus.

Preferably, the beverage making apparatus and beverage making system according to these aspects of the invention are adapted to carry out a method according to the present invention.

Accordingly, in a further aspect the present invention provides a beverage making system for preparing a foamed beverage by a method according to the present invention, said brewing system comprising: a beverage making apparatus having a capsule holder; a capsule containing a foamable ingredient and adapted to be received in the holder of the beverage making apparatus; and a second capsule containing a beverage brewing ingredient and adapted to be received in the holder of the beverage making apparatus.

In a further aspect, the present invention provides a beverage making apparatus comprising: a holder for holding a capsule containing a beverage brewing ingredient; a source of hot liquid and an injector for injecting the hot liquid into the capsule held in the holder to brew a beverage component in the capsule; and a control system and display programmed to prompt a user to carry out the following sequential steps in response to a command to brew a multicomponent beverage:

(a) insert a first capsule containing a first beverage brewing ingredient into the holder;

(b) wait while a first beverage component is brewed from the first capsule;

(c) insert a second capsule containing a second beverage brewing ingredient into the holder; and (d) wait while a second beverage component is brewed from the second capsule.

It can be seen that the invention allows multicomponent beverages to be brewed from equipment having a single capsule holder in a straightforward way. The holder for the capsule will typically comprise a clamp that grips the capsule while water is injected into the capsule. The clamp may comprise jaws to grip at least a portion of the capsule. The apparatus may comprise a door or tray or drawer that opens to allow insertion of the capsule into the clamp, and that closes while liquid injection is taking place.

The control system and display may comprise for example a liquid crystal display and soft key controls. In addition to visual prompts on the display screen, the prompts (a) and (c) may include mechanically opening the capsule holder to permit insertion of a capsule.

The beverage making apparatus may further provide a prompt after prompt (d), as follows: (e) remove finished beverage from the apparatus.

In typical embodiments the prompt (a) directs the user to insert a capsule containing a foamable beverage component, for example a foamable whitener such as a spray dried milk powder. It is preferable to foam the milk first, since the second ingredient (e.g. coffee) tends to inhibit foaming.

Typically, the beverage making apparatus according to this aspect of the invention has the control system and display programmed to prompt a user to select a beverage prior to said step (a). The prompt to select a beverage may be by means of one or more menu selection screens accessed by soft keys. The apparatus may also be programmed to prompt the user to provide a payment before said step (a).

The payment may be by means of a coin-freed mechanism, or a card swipe, or some other automatic debiting procedure provided in the system.

Preferably, the control system is programmed to provide a partial refund of the payment if the brewing cycle is interrupted before the second beverage component is brewed from the second capsule. For example, a value equal to the value of the second beverage component only may be refunded.

The display may show a welcome screen, such as a logo or a picture of a cup of coffee, when not in use. The apparatus may also be programmed to prompt the user to place a receptacle in the apparatus before said step (a). The apparatus may comprise a cup-detect interlock, for example an infrared detector interlock, to block or interrupt the operation of the apparatus if there is no receptacle in a beverage receiving position in the apparatus.

In other embodiments the beverage making apparatus further provides the following prompts between prompts (b) and (c):

(f) insert a liquid jet nozzle into the holder;
(g) wait while a high velocity jet of liquid is pumped through the nozzle.

Preferably, the liquid jet nozzle is dimensioned as described above to provide a high velocity jet. These embodiments have the advantage that existing equipment can be modified for foamed beverage production without the need to retrofit jet nozzles. Also, the removable jet nozzle inserted in step (f) can be made disposable to avoid problems of scale build-up in jet nozzles.

In a further aspect the present invention provides a beverage making system comprising a beverage making apparatus according to the invention, at least one first capsule containing a first beverage component, and at least one second capsule containing a second beverage component different from the first component. Preferably, the first beverage component comprises a foamable beverage ingredient and the second beverage component comprises coffee or tea.

The invention further provides a method of brewing a beverage, comprising the steps of: providing a beverage making system according to the invention, instructing the system to brew a multicomponent beverage, and inserting the first and second capsules into the holder in response to prompts provided by the system in order to brew the said multicomponent beverage.

Typically, the beverage brewing ingredient comprises ground coffee or leaf tea, preferably in an amount suitable to brew a single cup of beverage. For example, from about 2 g to about 12 g of ground coffee or from about 1 g to about 9 g of leaf tea. It will be appreciated that the construction of the capsule containing a beverage brewing ingredient will normally be substantially similar to the construction of the capsule containing a foamable food ingredient. It is a particular advantage of the present invention that the capsules can be manufactured and filled on the same equipment, and can be fed sequentially into the same capsule holding, brewing and manipulating mechanism. The beverage brewing capsule may additionally comprise a filter element, such as a filter paper bonded to an interior surface thereof.

The liquid may be injected into the capsule containing the beverage brewing ingredient in amounts, at pressures, and at temperatures similar to those described above in relation to the capsule containing the foamable ingredient.

In other embodiments the liquid is injected into the capsule containing the beverage brewing ingredient at pressures of from about 200 kPa to about 2 MPa (about 2 to about 20 bar), preferably from about 200 kPa to about 1 Mpa (about 2 to about 10 bar). These pressures are conventionally generated for brewing espresso coffee. Preferably, the liquid injected in this stage of the process consists essentially of water.

Preferably the total amount of liquid injected in the process is from 100 to 400 ml. Preferably the product comprises from about 10% to about 50% of foam by volume, more preferably from about 20% to about 35% foam by volume.

In certain embodiments a first pump may be used to supply liquid to both the capsule injector and to the liquid jet outlet. More usually a second pump is provided for supplying liquid to the liquid jet. The liquid preferably consists essentially of water.

The beverage making apparatus preferably further comprises a mechanical ejection means for ejecting capsules from the holder after water injection is complete.

Preferably, the apparatus further comprises a mechanism operatively associated with the holder to retract the injection tube or tubes when the holder is opened.

Preferably, the apparatus and systems according to the present invention include a cup-detector, whereby beverage brewing is interrupted unless the cup-detector records the presence of a receptacle in a position in the apparatus to receive liquid from the capsule outlets. Preferably, the cup detector includes a source of infrared radiation and a sensor for said infrared radiation, in particular a sensor for infrared radiation reflected from a surface of the receptacle when the receptacle is correctly positioned in the apparatus. Preferably the apparatus is adapted to prompt the user to insert a cup in the event that the detector does not detect a cup in the correct position.

The foamy beverage producing methods of the present invention require minimal adaptation of existing beverage vending equipment, and in particular avoid the need for high pressures or steam injection. Furthermore, they can frequently be used in conjunction with existing beverage brewing ingredient pack formats, or with minimal adaptation of such formats.

As already discussed, in certain aspects of the methods according to the present invention the high velocity liquid jet may be formed by an inlet or outlet nozzle provided in the capsule containing the foamable ingredient. Accordingly, in a further aspect, the present invention provides a capsule for the preparation of an edible foam comprising: side walls defining an interior region containing a foamable ingredient; an inlet for injecting a liquid into the said region; and an outlet for allowing liquid to escape from the said region, wherein at least one of the said inlet and outlet comprises a constriction for providing a liquid jet having a diameter of from about 0.5 to about 2 mm.

The foamable ingredient may be any food-acceptable ingredient that forms a foam on high-shear mixing with water, as hereinbefore described.

The dry weight of the foamable ingredient may typically be from about 1 to about 50 g, preferably from about 2 to about 15 grams, more preferably from about 5 to about 12 grams. In other words, the amount of the ingredient in each package is preferably sufficient for one portion of the foamed product, e.g. one cup of a foamy beverage.

Preferably, the package is substantially shelf stable. That is to say, it may be stored at ambient temperature and atmospheric conditions for a period of at least 3 months, preferably at least one year, without deterioration.

The capsule is normally formed of thermoplastic material, and is disposable after one use. The capsule may comprise at least one side wall formed from a substantially rigid sheet material. For example, capsules having substantially cylindrical shapes are envisaged. More typically the capsule comprises a side wall formed from flexible film material, for example a tubular sachet formed on a form-fill-seal machine, or a body formed by bonding together front and back sheets of film material around the edges thereof to define a sachet. The capsule will normally be substantially air and moisture impermeable before use in order to preserve the food ingredient in a shelf stable condition.

In certain embodiments the internal volume of the capsule is from about 25 to about 100 $cm^3$. The internal volume refers to the maximum volume of the capsule when fully distended. This internal volume is typically at least twice the volume of the foamable ingredient, in order to allow space for turbulent flow and mixing of the aqueous liquid with the ingredient in the capsule.

The inlet or outlet is adapted to provide a narrow diameter liquid jet into the interior of the capsule, and/or out of the interior of the capsule in use. The resulting high shear mixing when the jet hits a liquid surface containing the foamable ingredient results in foam formation.

Preferably, the constriction provides a jet having a diameter of from about 0.7 to about 1.5 mm, more preferably about 1 mm.

In certain embodiments the capsule may comprise two or more jet-forming inlets or outlets in order to combine high shear with an increased liquid flow rate. The two or more inlets may be connected through a manifold to a single liquid inlet duct. At least one of the inlets may be angled to assist swirling and washing out of the capsule.

The internal cross-section of the jet-forming inlet or outlet is normally a regular shape, and preferably it is substantially circular. Since aqueous liquids are substantially incompressible and not significantly viscoelastic, it follows that the internal cross sectional area of the jet-forming region of the inlet and/or the outlet is generally from about 0.2 to about 3 $mm^2$, preferably from about 0.4 to about 2 $mm^2$, for example about 1 $mm^2$.

If the constriction (narrow bore, jet forming region) of the inlet or outlet is too short, then the inlet or outlet tends to form a spray rather than a jet. If the constriction is too long, then the pressure drop across the constriction may be too high. Accordingly, the constriction preferably extends for a distance of from about 1 to about 5 mm, preferably about 2 to about 4 mm along the direction of liquid flow.

In certain embodiments the jet forming region of the inlet or outlet may comprise a disposable nozzle. The nozzle may be formed by injection moulding of plastic material and may be secured in liquid-tight fashion into a seal between front and back sheets of film material making up the capsule, substantially as described in EP-A-0179641 or WO-A-9905036. In these earlier documents the bore area of the nozzle was substantially greater than 3 $mm^2$ in order to provide rapid flow of liquid into the sachets. The nozzle in the capsules according to the present invention may comprise an inlet duct of diameter about 3 mm or more for compatibility with existing beverage brewing machines, but the exit from the nozzle may have a constricted cross-section to form a jet as hereinbefore described. The disposable inlet or outlet nozzle provides the advantage that it does not get blocked by scale or contaminated by prolonged use.

In certain embodiments the capsule outlet is sealed by freshness barrier. The term "freshness barrier" refers to a barrier that is substantially impermeable to air or moisture so as to preserve the freshness of the beverage brewing ingredient by preventing ingress of air or moisture through the liquid guide before brewing commences. The freshness barrier may be released by an external mechanical force or thermal field applied during brewing. The freshness barrier is preferably releasable by the action of pressure and/or hot water from inside the sachet during brewing. For example, the freshness barrier may comprise a layer of a sealant that is released by the action of heat and/or moisture, such as an adhesive as described in EP-A-0179641 or WO99/05036.

In certain embodiments of the invention, the constriction is provided in the inlet. In such embodiments, the outlet is preferably located substantially opposite to the inlet. An advantage of the outlet being located opposite the inlet is that the jet from the inlet can clear blockages of the outlet caused by incompletely dispersed foamble ingredient.

In certain other embodiments, the jet forming constriction is provided in the outlet only. An advantage of such embodiments is that the outlet nozzle can be angled to swirl the liquid in the receptacle. However, these embodiments are not preferred, since the outlet is then prone to blocking by particles of the foamable material. Preferably, the capsule comprises either a jet-forming outlet situated opposite to a jet forming inlet, as described above, or a large outlet situated opposite to a jet forming inlet, as follows.

In the large-outlet embodiments the outlet is adapted to provide, in use, an opening having a cross sectional area preferably greater than about 1 $cm^2$, whereby a jet of water issuing from the inlet can pass through the capsule and out of the opening substantially without touching the side walls of the capsule. The jet then impacts the liquid in a receptacle below the capsule to cause foaming.

Preferably, the outlet is sealed by a freshness barrier as hereinbefore described, so that the injection of water into the capsule initially causes mixing with the foamable food ingredient. The freshness barrier is then released to form said opening, whereby releasing the food ingredient into the receptacle, followed by further water injection, produces foam in the receptacle.

For example, in certain embodiments the capsule comprises two flexible sheets bonded together along a seam situated opposite the inlet, said bonding being releasable by the action of heat or pressure inside the capsule, whereby the two sheets peel apart under said action to provide said opening.

In certain embodiments the capsules used in the methods and systems of the present invention may comprise machine readable pack recognition means on the capsule to assist use of the capsule in fully automated vending equipment. For example, the capsules may comprise machine readable projections or perforations or a bar code. In these embodiments the apparatus comprises compatible machine recognition capabilities to recognize and manipulate the capsules.

It will be appreciated that the optional and/or preferred features described in conjunction with any one of the above aspects of the invention may also be present, alone or in combination with any of the other optional and/or preferred features, in capsules, beverage making apparatus or systems, nozzles or methods according to any other aspect of the invention.

BRIEF DESCRIPTION OF THE DRAWINGS

Specific embodiments of the present invention will now be described further, by way of example, with reference to the accompanying drawings, in which.

DETAILED DESCRIPTION OF THE INVENTION

Figure 1:
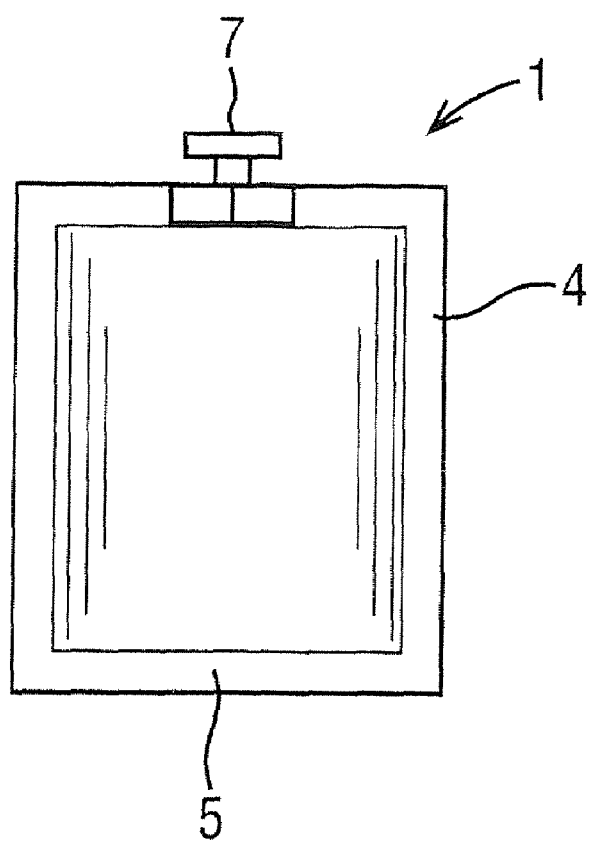
FIG. 1 shows a plan view of a first capsule containing a foamable ingredient for use in a first method according to the present invention.
Figure 2:
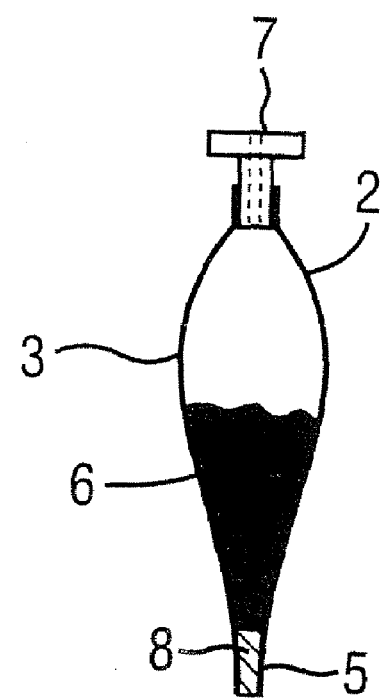
FIG. 2 shows a longitudinal sectional view through the capsule of FIG. 1.

Referring to FIGS. 1 and 2, the capsule 1 is in the form of a sachet formed from two sheets of laminated, metallized flexible plastic film 2,3 bonded together around a margin 4. A lower part 5 of the margin is bonded by means of a layer of adhesive 8 that can be released by the action of hot water inside the sachet. In a top margin of the sachet a nozzle 7 is inserted between the sheets 2,3 and bonded thereto in air tight fashion. The capsule has an internal volume of approximately 50 cm$^3$ when fully distended. Thus far the construction of the package 1 is similar to the beverage brewing sachets described in EP-A-0179641 or WO99/05036. The capsule is approximately half filled with approximately 5-10 g of a foamable powdered milk 6.

The nozzle 7 is formed by injection moulding of a thermoplastic material such as polypropylene. It is bonded by adhesive or melt bonding in air-tight fashion to the front and back sheets 2, 3 of the sachet. The nozzle 7 comprises a bore region having a uniform internal diameter of approximately 3 mm, into which a water injection tube 15 is inserted in use. A flange is provided at the top of the nozzle to assist mechanical gripping and manipulation of the sachet in the brewing apparatus. Finally, a plastics laminated foil freshness barrier (not shown) is sealed over the top of the nozzle. This results in a fully air tight and moisture-tight package that is shelf stable.

Figure 3:
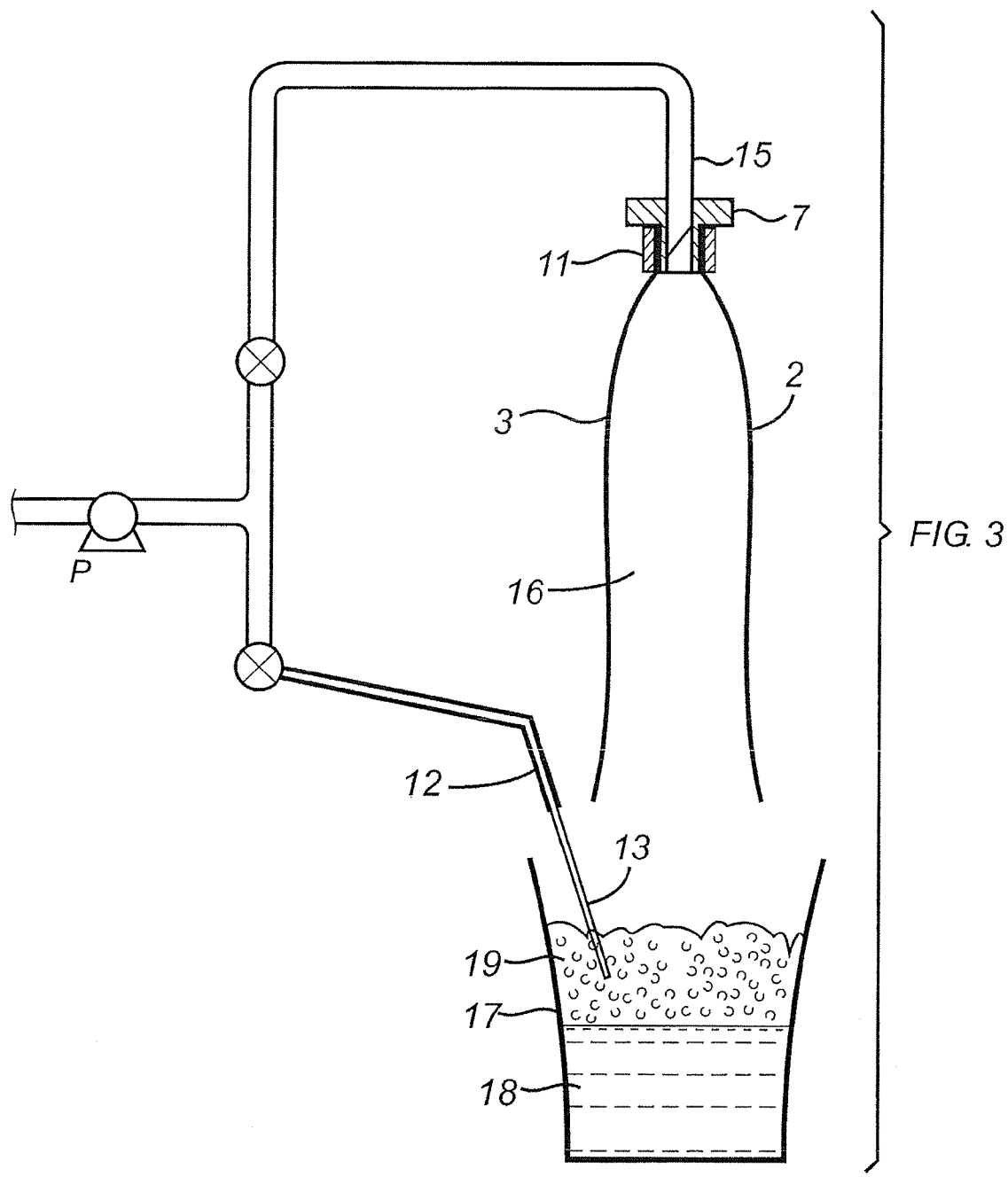
FIG. 3 shows the capsule of FIGS. 1 and 2 after injection of liquid into the capsule has been completed, and while further injection of a jet of liquid into a receptacle is taking place.

With reference to FIG. 3, in use the capsule 1 is held in a beverage making apparatus by capsule holder 11 which grips the capsule below the nozzle flange. A water inlet tube 15 is advanced to pierce the freshness barrier in the nozzle 7, and hot water at about 90° C. is then injected through the tube 15 into the capsule 1. A first pump P may be used to supply liquid to both the capsule injector via inlet tube 15 and to the liquid jet nozzle 12. The hot water undergoes turbulent mixing with the powdered milk 6 in the capsule 1 to product an aqueous dispersion of the powdered milk. The hot water also releases the seal 8 at the bottom of the capsule, thereby allowing the aqueous milk dispersion to drop into the receptacle 17. The total amount of water injected in this stage is about 50 ml.

Once water injection into the capsule 1 is complete, the beverage making apparatus automatically jettisons the used capsule into a waste receptacle. Simultaneously or sequentially, a jet of water 13 is pumped into the liquid mixture in the receptacle 17 through jet inlet 12. The jet diameter is about 1 mm, the jet velocity is about 5 m/s and the amount of water injected through the jet is about 60 ml. The jet of water causes foaming of the mixture in the receptacle 17 to produce a foamed liquid comprising a liquid layer 18 and a foam layer 19.

Figure 4:
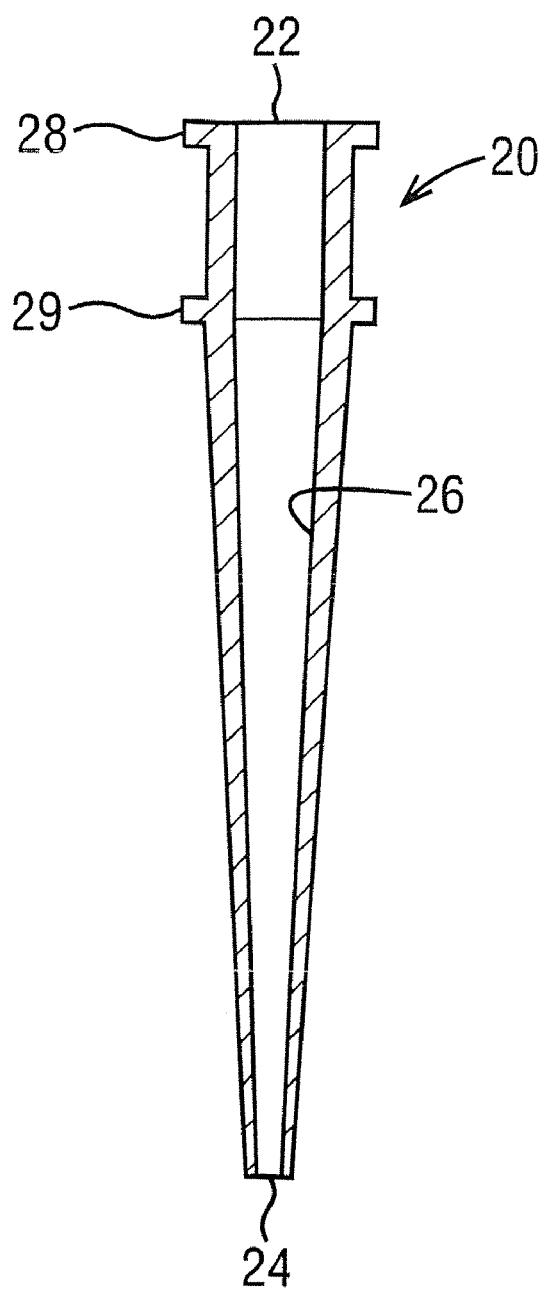
FIG. 4 shows a longitudinal cross-section through a liquid injection nozzle according to the present invention for use in the beverage making method and apparatus of FIG. 3.

The jet inlet 12 comprises a nozzle 20 according to the present invention, as shown in more detail in FIG. 4. The nozzle 20 is formed in one piece by injection molding of a thermoplastic such as a polyacetal, polypropylene or other food-approved plastic. The length of the nozzle is about 5 cm and the wall thickness is in the range 0.2 to 1.5 mm. The nozzle tapers from an inlet 22 having an inside diameter of about 4 mm to an outlet 24 having a diameter of about 1 mm. The bore 26 of the nozzle is circular in cross-section tapered along its whole length with an included taper angle of about 2 degrees. The low taper angle results in a jet, rather than a spray, of water at the outlet. The inside surface of the bore is 26 very smooth in order to minimize limescale deposition. The nozzle is provided with flanges 28, 29 to permit insertion and replacement of the nozzle in the apparatus using a spring-loaded bayonet fitting or similar.

Figure 5:
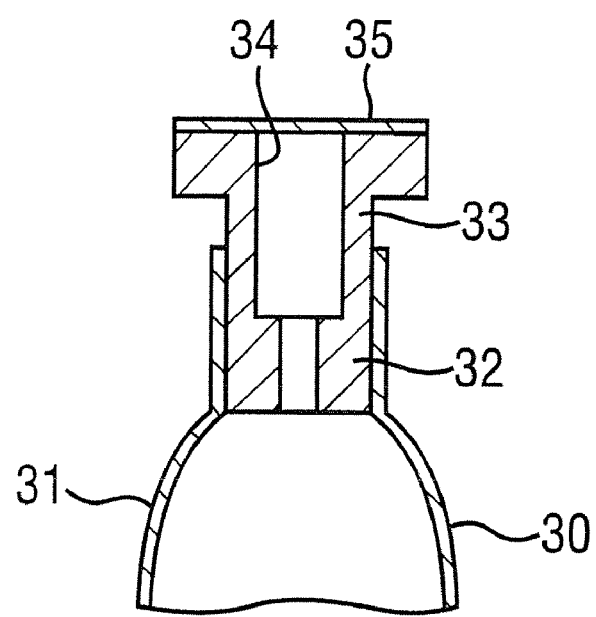
FIG. 5 shows a detail cross-sectional view of the inlet nozzle region of a capsule according to the present invention for use in a second method according to the invention.
Figures 6, 7:
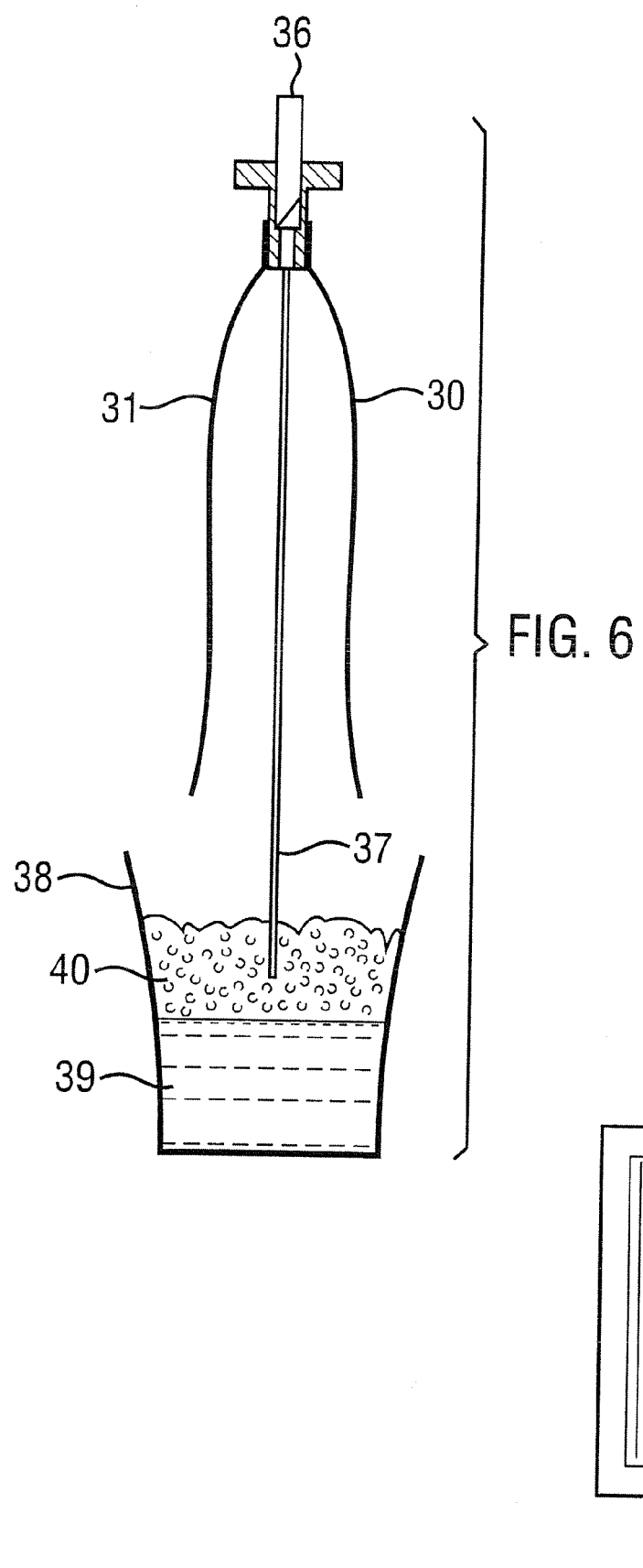
FIG. 6 shows a schematic longitudinal sectional view through the capsule of FIG. 5 in use in use to brew a foamed beverage.
FIG. 7 shows a plan view of a further capsule according to the present invention for use in a further method according to the invention.

Referring now to FIGS. 5 and 6, an alternative method according to the invention uses a sachet that is specifically adapted according to the present invention. The construction of the sachet is similar to the beverage brewing sachets described in EP-A-0179641 or WO99/05036 and shown in FIGS. 1 and 2. However, the sachet differs from the earlier sachets in that the inlet nozzle is adapted to form a high velocity jet as described further below.

Referring to FIG. 5, the inlet nozzle of the inventive sachet is formed by injection moulding of a thermoplastic material such as polypropylene. It is bonded by adhesive or melt bonding in air tight fashion to the front and back sheets 30, 31 of the sachet. The nozzle comprises a narrow bore region 32 having a substantially cylindrical bore approximately 3 mm long and 1 mm in diameter. The nozzle further comprises a relatively wide bore outer region 33 having an internal diameter of approximately 3 mm, into which a water injection tube is inserted in use. A flange 34 is provided at the top of the nozzle to assist mechanical gripping and manipulation of the sachet in the brewing apparatus. Finally, a plastics laminated foil freshness barrier 35 is sealed over the top of the nozzle. This results in a fully air tight and moisture-tight package that is shelf stable.

Referring to FIG. 6, in this method according to the invention the sachet is inserted into a beverage making apparatus (not shown), in which it is gripped by jaws (not shown) under the flange 34. A water injection tube 36 attached to the apparatus is advanced until it pierces through the freshness barrier film 35 and forms a pressure-tight mating fit in the wide bore section 33 of the nozzle. Water at about 90° C. and at an initial pressure of about 0.2 bar (20 kPa) is injected through the nozzle and into the capsule, where it mixes with the powdered milk to form a concentrated milk dispersion. The hot water and pressure them release the adhesive bond in the lower margin of the capsule and the concentrated milk dispersion drops into the receptacle 38. This initial injection stage typically takes from 5 to 10 seconds, and the total amount of water injected in this stage is from 50 to 60 ml.

The water injection pressure is then increased to approximately 2 bar (200 kPa), which causes the water to emerge from the narrow bore section 32 of the nozzle as a high velocity jet having a diameter of approximately 1 mm and a velocity of approximately 15 m/sec. This high energy jet 37 impacts the liquid 39 present in the receptacle 38 with high shear mixing to produce a layer of foam 40. The water jet injection stage typically takes from 10 to 30 seconds, and the total amount of water injected is from 10 to 250 ml.

After the step of water injection is complete, the injection tube 36 is retracted, and the empty capsule is ejected into a waste receptacle. A water spray (not shown) is then briefly applied to the foam 40 in the receptacle 38 to disperse any large bubbles present at the top of the foam layer 40 to provide a stable, spoonable milk foam layer.

Referring to FIG. 7, alternative inventive capsule 42 also comprises front and back sheets of metal laminated flexible plastic sheet material bonded together around a margin 43. A nozzle 45 of similar construction to the nozzle of the embodiment shown in FIG. 5 is inserted in top region of the margin. An outlet nozzle 46 is inserted in a bottom region 44 of the margin. The nozzle 46 provides the sole outlet from the capsule, since the margin 44 is not releasable by the action of heat or water inside the capsule. The nozzle 46 is molded from thermoplastics in similar fashion to the nozzle of FIG. 5, and has a narrow bore adapted to provide an outlet jet of diameter about 1 mm. A freshness barrier film is provided in the nozzle 46 that can be ruptured by pressure.

In use the package of FIG. 7 is clamped tightly in a cavity having a clam shell configuration within the beverage making apparatus. The cavity encloses and supports the package and prevents it from bursting under the pressure of injected water. Water is injected into nozzle 43 initially at fairly low pressure as describe above in relation to the embodiments of FIG. 5. The water mixes with the powdered milk in the sachet, and the pressure inside the sachet increases until the freshness barrier in the outlet nozzle 46 bursts, whereupon the mixture is ejected as a high velocity jet from the outlet nozzle 46. Water injection through the inlet nozzle 43 is continued at high pressure to rinse out the capsule, clear any blockages in the outlet nozzle 46, and continue injection into the receptacle below the package to produce a foam as previously described. The remaining steps of the process are as described above.

The foamed milky liquid produced by any of the above embodiments normally requires the addition of a beverage flavour to render it more palatable. In an embodiment of the invention a beverage brewing capsule is inserted into the same holder in the beverage making apparatus as the foamable milk capsule. The beverage brewing capsule is constructed in similar fashion to the capsule of FIG. 1, but is filled with ground coffee and incorporates a filter element. The beverage is brewed by injection of hot water into the nozzle of the capsule in similar fashion as for the milk-containing capsule. The brewed coffee escapes from the bottom of the capsule and drops through the foam layer into the liquid layer in the receptacle. The spent beverage brewing sachet is then automatically discarded by the apparatus. A fine spray of water may be applied briefly to the top of the foam in the cup to disperse large bubbles in the foam.

A final jet of water may be briefly injected, for example through nozzle 12, to swirl the contents of the receptacle and thereby mix the brewed beverage with the milky liquid already in the receptacle.

The method according to the present invention may be carried out in either semi-automatic or fully-automatic fashion by beverage vending equipment. In the semi-automatic embodiment, the process is initiated by a user selecting a foamed beverage option from the vending equipment. The system prompts the user to insert a milk powder capsule by opening a door leading to a beverage brewing enclosure equipped with the capsule holder. The machine then automatically grips the capsule, and injects water into the capsule for a predetermined time to achieve the initial mixing and to deposit the water and milk powder mixture into the receptacle. The machine then automatically injects further water into the receptacle in a high velocity jet to achieve the desired hot foamed milk in the receptacle. The machine also automatically discards the spent capsule, either before or after the step of jetting, depending on the particular embodiment.

In the semi-automatic mode, the machine then prompts to the user to insert a beverage brewing capsule, and opens the clamp of the capsule holder. The user can select the desired beverage capsule, insert it into the same holder in the machine, whereupon the machine automatically injects water into the capsule to brew the beverage inside the capsule and to release the barrier at the bottom of the capsule to release the beverage into the receptacle. Finally, the machine automatically discards the spent brewing beverage capsule and "finishes" the foamed beverage by a brief water jet injection to swirl the beverage, and a brief water spray over the foam to remove any large bubbles on the surface of the foam.

In the fully automatic embodiments, the milk powder capsules and beverage brewing capsules are stocked inside the vending machine, and the machine additionally selects the appropriate sachets and feeds them to the sachet holder at the appropriate times in response to the initial beverage brewing instruction from the user.

In an alternative embodiment, the jet forming nozzle is removably inserted into the same beverage brewing clamp in the apparatus as the foamable milk sachet and/or the beverage brewing sachet. This embodiment requires no modification of existing brewing equipment. In this embodiment, the foamable milk sachet shown in FIG. 1 is initially inserted into the apparatus as described above, and liquid is injected into the capsule to deposit a mixture of milk and water into the receptacle.

The apparatus then opens the door leading to the beverage brewing enclosure and prompts the user to insert a jet nozzle into the holder. The jet nozzle is a disposable or multi-use thermoplastic nozzle having an internal diameter adapted to provide a high velocity jet of water of diameter about 1 mm, as hereinbefore described. Once the nozzle is inserted, the apparatus pumps water through the nozzle to produce a high velocity jet into the receptacle, where it forms a milky foam by high shear mixing entraining air into the liquid. The jet diameter is about 1 mm, the jet velocity is about 5 m/s and the amount of water injected through the jet is about 60 ml. The system then automatically discards a disposable nozzle, or alternatively opens and prompts the user to remove a multi-use nozzle.

The machine then prompts to the user to insert a beverage brewing capsule and carries out the subsequent steps as already described.

The above embodiments have been described by way of example only. Many other embodiments falling within the scope of the accompanying claims will be apparent to the skilled reader.

What is claimed is:

1. A method for the preparation of a foamed drink comprising the steps of:
   providing a capsule containing a foamable ingredient;
   providing a receptacle positioned to collect fluid escaping from the capsule;
   injecting liquid into the capsule to mix with the foamable ingredient;
   allowing the foamable ingredient mixed with the liquid to escape from the capsule into the receptacle; followed by injecting further liquid into the receptacle through a nozzle separate from said capsule in a jet having a diameter of from about 0.5 mm to about 2 mm to produce foamed liquid in the receptacle.

2. A method according to claim 1, wherein the jet is directed at an angle to the vertical to swirl the liquid in the receptacle.

3. A method according to claim 1, wherein the bottom of the receptacle is located from about 5 cm to about 25 cm below the bottom of the capsule outlet.

4. A method according to claim 1, wherein the liquid is injected into the capsule at a temperature of from 80 degrees C. to 100 degrees C.

5. A method according to claim 1, wherein the jet velocity of the liquid jet is from 5 m/s to 50 m/s.

6. A method according to claim 1, wherein the liquid consists essentially of water.

7. A method according to claim 1, wherein the foamable ingredient comprises a partially or completely dehydrated dairy or non-dairy beverage whitener.

8. A method according to claim 7, wherein the foamable ingredient consists essentially of a foamable milk powder.

9. A method according to claim 1, wherein the dry weight of the foamable ingredient in the capsule is from about 5 g to about 50 g.

10. A method according to claim 1, wherein an outlet of the capsule is sealed by a freshness barrier that can be released by the action of water, heat or pressure from inside the capsule.

11. A method according to claim 1, wherein the liquid is injected into the capsule at a pressure of from about 30 kPa (0.3 bar) to about 200 kPa (2 bar).

12. A method according to claim 1, further comprising the steps of:
   providing a second capsule containing a beverage brewing ingredient;
   injecting liquid into the second capsule to brew a beverage inside the capsule; and
   allowing the beverage to escape from the capsule into the receptacle.

13. A method according to claim 12, wherein the said steps of injecting liquid into the second capsule is carried out after the steps of producing an edible foamed liquid, and the beverage is added to the edible foamed liquid in the receptacle.

14. A method according to claim 12, wherein the capsule containing a foamable food ingredient and the second capsule containing a beverage brewing ingredient are sequentially held in, and mechanically ejected from, the same holder during said method.

15. A method according to claim 12, wherein the beverage brewing ingredient comprises ground coffee or leaf tea.

16. A beverage making apparatus for preparing an edible foamed liquid by a method according to claim 1, comprising:
   a capsule holder adapted to receive a capsule containing a foamable ingredient;
   a first pump for supplying liquid under pressure;
   a liquid injection tube connected to said first pump for injecting the liquid into the capsule; and
   a jet nozzle for producing a liquid jet having a diameter of from about 0.5 mm to about 2 mm.

17. A beverage making apparatus according to claim 16, further comprising:
   a liquid injection nozzle having an inlet and an outlet and a bore extending between the inlet and the outlet, wherein the cross-sectional area of the outlet is from about 0.2 mm² to about 5 mm², and
   wherein the bore is tapered between the inlet to the outlet.

18. A beverage making apparatus according to claim 17, wherein the bore is substantially continuously tapered between the inlet of the nozzle and the outlet of the nozzle.

19. A beverage making apparatus according to claim 17, wherein inner surfaces of the nozzle bore are substantially smooth.

20. A beverage making apparatus according to claim 17, wherein the angle of taper of the bore is in the range of from about 0° to about 10°.

21. A beverage making apparatus according to claim 20, wherein the angle of taper of the bore is in the range of from about 0.5° to about 5°.

22. A beverage making apparatus according to claim 17, wherein the length of the bore is in the range of from about 1 cm to about 10 cm.

23. A beverage making apparatus according to claim 17, wherein the cross-section of the bore is substantially circular.

24. A beverage making apparatus according to claim 16, wherein the nozzle is demountable from the beverage making apparatus.

25. A beverage making system for preparing a foamed beverage by a method according to claim 1 or 12, said system comprising:
   a beverage making apparatus having a capsule holder;
   a capsule containing a foamable ingredient and adapted to be received in the holder of the beverage making apparatus; and
   a second capsule containing a beverage brewing ingredient and adapted to be received in the holder of the beverage making apparatus.

26. A method of preparing a foamed drink comprising the steps of:
   providing a capsule comprising side walls defining an enclosed region containing a foamable ingredient, an inlet for injecting a liquid into the said region, and an outlet for allowing liquid to escape from the said region, wherein said inlet comprises a constriction for providing a liquid jet having a diameter of from about 0.5 mm to about 2 mm;
   injecting an aqueous liquid under pressure into the inlet;
   allowing the foamable ingredient to mix with the aqueous liquid in the capsule;
   followed by allowing the aqueous liquid to escape through the outlet of the capsule and into a receptacle as a high velocity jet.

27. A method of preparing a foamed drink comprising the steps of:
   providing a capsule comprising side walls defining an enclosed region containing a foamable ingredient, an inlet for injecting a liquid into the said region, and an outlet for allowing liquid to escape from the said region, wherein said outlet comprises a constriction for providing a liquid jet having a diameter of from about 0.5 to about 2 mm;
   injecting an aqueous liquid under pressure into the inlet;
   allowing the foamable ingredient to mix with the aqueous liquid in the capsule;
   followed by allowing the aqueous liquid to escape through the outlet of the capsule and into a receptacle as a high velocity jet;

providing a second capsule containing a beverage brewing ingredient;
injecting liquid into the second capsule to brew a beverage inside the capsule; and
allowing the beverage to escape from the capsule into the receptacle;

wherein the said steps of injecting liquid into the second capsule is carried out after the steps of producing an edible foamed liquid, and the beverage is added to the edible foamed liquid in the receptacle.

\* \* \* \* \*